(12) United States Patent
Shah et al.

(10) Patent No.: US 9,898,062 B2
(45) Date of Patent: **\*Feb. 20, 2018**

(54) SYSTEMS AND METHODS FOR PROTECTION OF COMPONENTS IN ELECTRICAL POWER DELIVERY SYSTEMS

(71) Applicant: Schweitzer Engineering Laboratories, Inc., Pullman, WA (US)

(72) Inventors: Saurabh B. Shah, Pullman, WA (US); Kamal Garg, Pullman, WA (US); Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 244 days.

This patent is subject to a terminal disclaimer.

(21) Appl. No.: 14/444,295

(22) Filed: Jul. 28, 2014

(65) Prior Publication Data

US 2014/0359351 A1    Dec. 4, 2014

Related U.S. Application Data

(63) Continuation of application No. 12/882,521, filed on Sep. 15, 2010, now Pat. No. 8,792,217.

(51) Int. Cl.
| | |
|---|---|
| *G06F 11/07* | (2006.01) |
| *G06F 1/30* | (2006.01) |
| *H02H 7/26* | (2006.01) |
| *H02H 7/00* | (2006.01) |
| *H02H 7/06* | (2006.01) |

(52) U.S. Cl.
CPC ............ *G06F 1/30* (2013.01); *G06F 11/0793* (2013.01); *H02H 7/00* (2013.01); *H02H 7/261* (2013.01); *H02H 7/062* (2013.01)

(58) Field of Classification Search
CPC ......... G06F 11/0793; G06F 1/30; H02H 7/00; H02H 7/062; H02H 7/261
USPC .......................................................... 714/14
See application file for complete search history.

(56) References Cited

U.S. PATENT DOCUMENTS

| | | | |
|---|---|---|---|
| 4,387,336 | A | 6/1983 | Joy |
| 4,829,298 | A | 5/1989 | Fernandes |
| 5,006,846 | A | 4/1991 | Granville |
| 5,057,962 | A | 10/1991 | Alley |
| 5,224,011 | A | 6/1993 | Yalla |

(Continued)

OTHER PUBLICATIONS

Terry L. Conrad, A.P. Sakis Meliopoulos, Distributed State Estimator at U.S. Virgin Islands Water and Power Authority St. Thomas and St. John, NASPI Working Group Meeting, Mar. 7, 2008.

(Continued)

*Primary Examiner* — Yuhui R Pan
(74) *Attorney, Agent, or Firm* — Richard M. Edge

(57) ABSTRACT

Various embodiments disclosed herein provide protection to monitored equipment at both a local level and a system level, in order to offer more comprehensive protection. In one particular embodiment, the protected equipment may include one or more generators. The protection system may utilize time-synchronized data in order to analyze data provided by systems having disparate sampling rates, that are monitored by different equipment, and/or equipment that is geographically separated. Various embodiments may be configured to utilize a variety of sampling rates.

13 Claims, 7 Drawing Sheets

(56) References Cited

U.S. PATENT DOCUMENTS

| | | | |
|---|---|---|---|
| 5,264,778 | A | 11/1993 | Kimmel |
| 5,341,265 | A | 8/1994 | Westrom |
| 5,446,682 | A | 8/1995 | Janke |
| 5,498,956 | A | 3/1996 | Kinney |
| 5,592,393 | A | 1/1997 | Yalla |
| 5,680,324 | A | 10/1997 | Schweitzer |
| 5,694,281 | A | 12/1997 | Roberts |
| 5,703,745 | A | 12/1997 | Roberts |
| 5,731,943 | A | 3/1998 | Roberts |
| 5,963,404 | A | 10/1999 | Guzman |
| 6,028,754 | A | 2/2000 | Guzman |
| 6,236,949 | B1 | 5/2001 | Hart |
| 6,265,881 | B1 | 7/2001 | Meliopoulos |
| 6,341,055 | B1 | 1/2002 | Guzman |
| 6,356,421 | B1 | 3/2002 | Guzman |
| 6,411,865 | B1 | 6/2002 | Qin |
| 6,442,010 | B1 | 8/2002 | Kasztenny |
| 6,446,682 | B1 | 9/2002 | Viken |
| 6,603,298 | B2 | 8/2003 | Guzman |
| 6,608,742 | B2 | 8/2003 | Schweitzer |
| 6,662,124 | B2 | 12/2003 | Schweitzer |
| 6,757,146 | B2 | 6/2004 | Benmouyal |
| 6,839,210 | B2 | 1/2005 | Roberts |
| 6,845,333 | B2 | 1/2005 | Anderson |
| 6,924,628 | B2 | 8/2005 | Thompson |
| 6,946,753 | B2 | 9/2005 | Kernahan |
| 7,196,884 | B2 | 3/2007 | Guzman |
| 7,319,576 | B2 | 1/2008 | Thompson |
| 7,480,580 | B2 | 1/2009 | Zweigle |
| 7,498,818 | B2 | 3/2009 | Benmouyal |
| 7,570,469 | B2 | 8/2009 | Guzman |
| 7,582,986 | B2 | 9/2009 | Folkers |
| 7,630,863 | B2 | 12/2009 | Zweigle |
| 7,660,088 | B2 | 2/2010 | Benmouyal |
| 7,698,555 | B2 | 4/2010 | Jiang |
| 7,710,693 | B2 | 5/2010 | Guzman |
| 2004/0027748 | A1 | 2/2004 | Kojovic |
| 2004/0059469 | A1 | 3/2004 | Hart |
| 2006/0224336 | A1 | 10/2006 | Petras |
| 2007/0086134 | A1 | 4/2007 | Zweigle |
| 2008/0281540 | A1 | 11/2008 | Zweigle |
| 2008/0290666 | A1* | 11/2008 | Bourgeau ............. H02P 9/006 290/40 A |
| 2009/0085407 | A1 | 4/2009 | Venkatasubramanian |
| 2009/0088989 | A1 | 4/2009 | Guzman |
| 2009/0088990 | A1 | 4/2009 | Schweitzer |
| 2009/0089608 | A1* | 4/2009 | Guzman-Casillas .. G01R 29/18 713/340 |
| 2009/0091867 | A1 | 4/2009 | Guzman |
| 2009/0099798 | A1 | 4/2009 | Gong |
| 2009/0125158 | A1 | 5/2009 | Schweitzer |
| 2009/0216573 | A1 | 8/2009 | Heiberg-Anderson |
| 2009/0254655 | A1 | 10/2009 | Kidwell |
| 2010/0002348 | A1 | 1/2010 | Donolo |
| 2010/0114390 | A1 | 5/2010 | Stevenson |
| 2011/0035065 | A1 | 2/2011 | Schweitzer |

OTHER PUBLICATIONS

A.P. Sakis Meliopoulos, George J. Cokkinides, Floyd Galvan, Bruce Fardanesh, Distributed State Estimator-Advances and Demonstration, Proceedings of the 41st Hawaii International Conference on System Sciences, Jan. 7, 2008.

Ali Abur, Mladen Kezunovic, Sakis Meliopoulos, Enhanced State Estimation by Advanced Substation Monitoring, Power Systems Engineering Research Center (Pserc), Nov. 2002.

Saman A. Zonouz and William H. Sanders, A Kalman-based Coordination for Hierarchical State Estimation: Algorithm and Analysis, Proceedings of the 41st Hawaii International Conference on System Sciences, Jan. 7, 2008.

ABB: Improved Power System Performance through Wide Area Monitoring, Protection, and Control, Dec. 2004.

Patent Cooperation Treaty, International Search Report PCT/US2008/078246, dated Dec. 30, 2009.

Patent Cooperation Treaty, International Preliminary Report on Patentability PCT/US2008/078246, dated Dec. 16, 2008.

ABB, Wide Area Measurement, Monitoring, Protection and Control Industrial IT for Energy System Operation, Oct. 2003.

Sasa Jakovljevic, Mladen Kezunovic, Software for Enhanced Monitoring in Integrated Substations, 2003 IEEE Bologna Power Tech Conference, Jun. 23-26, 2003.

Y. Wu, M. Kezunovic, Automatic Simulation of IED Measurements for Substation Data Integration Studies, Power Engineering Society General Meeting, Jun. 12-16, 2005.

Sasa Jakovljevic, Data Collecting and Processing for Substation Integration Enhancement, May 2003.

M. Kezunovic, G. Latisko, Automated Monitoring Functions for Improved Power System Operation and Control, Power Engineering Society General Meeting, Jun. 12-16, 2005.

Siemens, Numerical Machine Protection 7UM515 V3.1 Instruction Manual, Jan. 1996.

Ramon Sandoval, Armando Guzman, Hector J. Altuve, Dynamic Simulations Help Improve Generator Protection, Sep. 15, 2006.

* cited by examiner

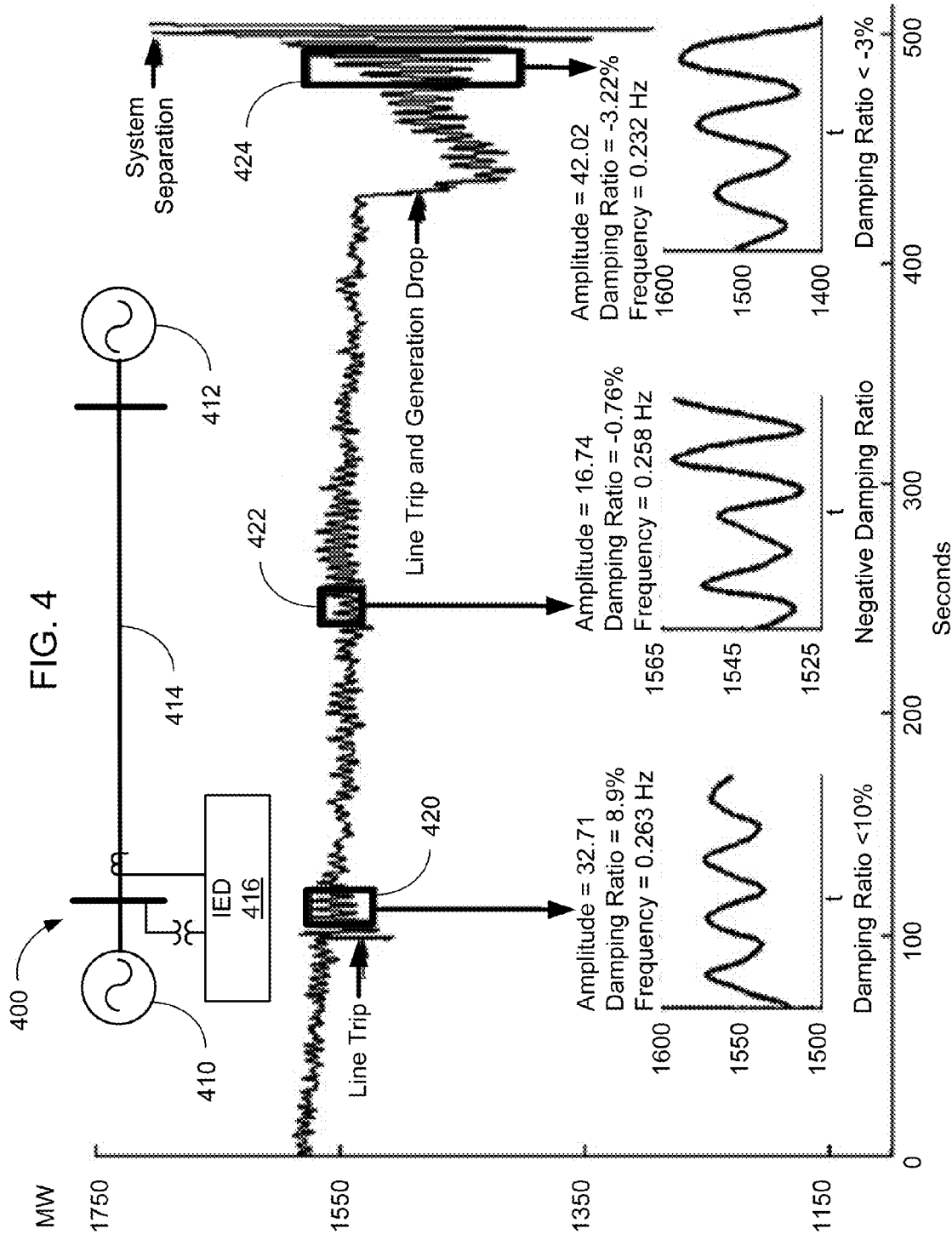

… …

SYSTEMS AND METHODS FOR PROTECTION OF COMPONENTS IN ELECTRICAL POWER DELIVERY SYSTEMS

RELATED APPLICATIONS

This application is a continuation application of, and claims benefit to co-pending U.S. patent application Ser. No. 12/882,521 filed on 15 Sep. 2010 entitled "Systems and Methods for Protection of Components in Electrical Power Delivery Systems", which is hereby incorporated by reference in its entirety.

TECHNICAL FIELD

This disclosure relates to protection of components in electrical power delivery systems.

BRIEF DESCRIPTION OF THE DRAWINGS

FIG. 4 illustrates a plot of the power output over time of a power generation and distribution system.

Figure 1:
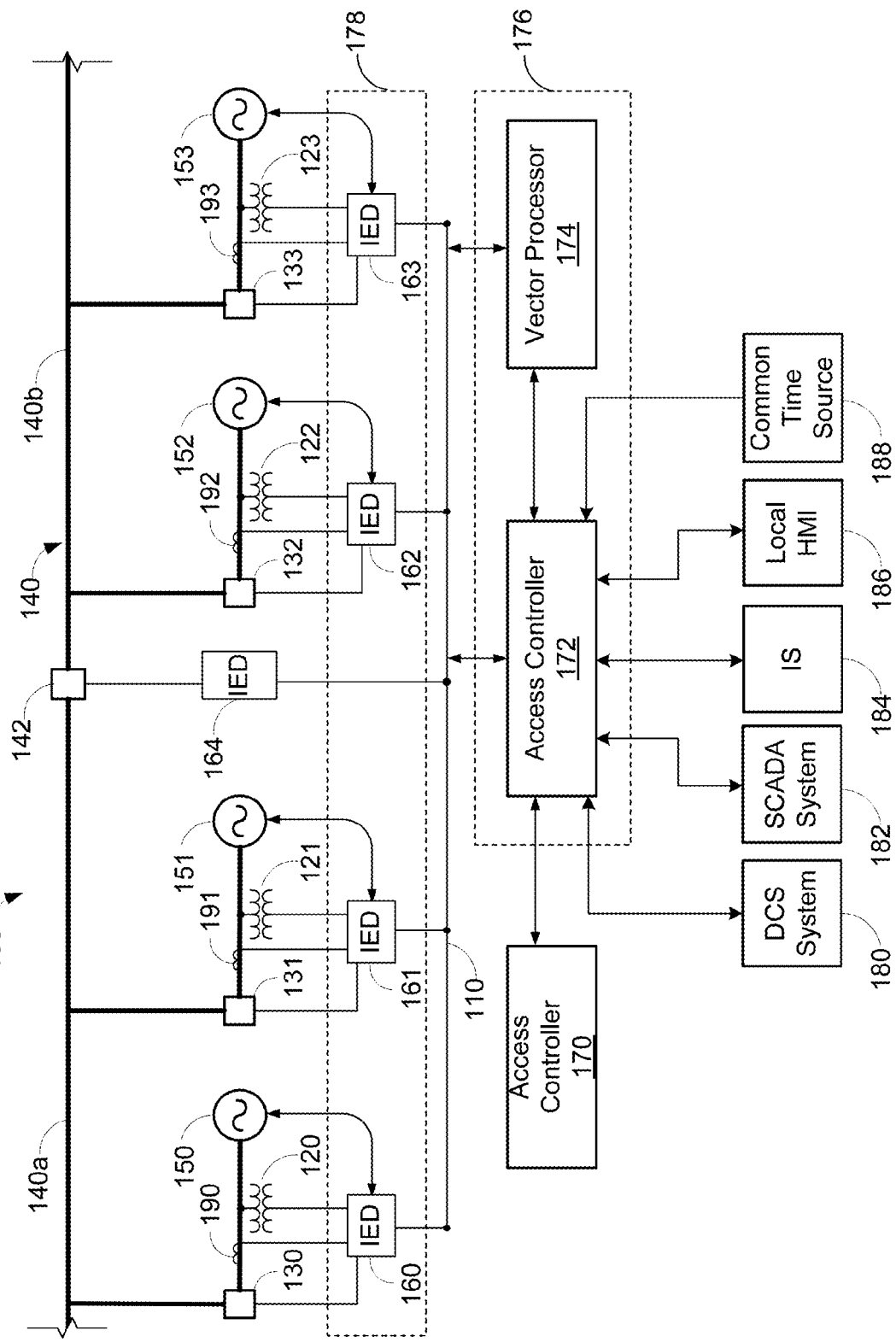
FIG. 1 illustrates a simplified one line diagram of an electric power delivery system.

Additional aspects and advantages will be apparent from the following detailed description of preferred embodiments, which proceeds with reference to the accompanying drawings.

DETAILED DESCRIPTION OF PREFERRED EMBODIMENTS

Electrical power generators in an electrical power generation and distribution system may operate in conjunction with protection systems designed to prevent damage to the electrical power generators that may be caused by certain conditions. Various protection systems may operate at different levels in an electrical power generation and delivery system. For example, one level of generator protection may be provided at the generator level. Generator protection systems that operate at the generator level, however, cannot detect external faults (e.g., a main bus failure). In another example, a generator protection system may operate at a supervisory level. Generator protection systems that operate at the supervisory level, however, may not detect individual generator faults or may not be able to determine the faulty generator in the case of "common-mode faults."

Various embodiments disclosed herein are configured to provide protection to monitored equipment at both a local level and a system level in order to offer more comprehensive protection. In one particular embodiment, the monitored equipment may include one or more generators. The protection system may utilize time-synchronized data in order to analyze data provided by systems having disparate sampling rates, that are monitored by different equipment, and/or equipment that is geographically separated. Various embodiments may be configured to utilize a variety of sampling rates. For example, one embodiment may obtain a time-synchronized data sample every cycle and may generate control signals within 2 to 3 cycles. Considering the response time of typical exciters and governors, these specifications may provide adequate protection to electrical power generators.

The systems and methods disclosed herein for protection of electrical generators may be applied to electrical power generation and delivery systems. Certain embodiments disclosed herein may be used in connection with systems capable of functioning as "islanded systems." As the term is utilized herein, an islanded system comprises any system in which electric power generators continue to provide electrical power in the absence of a connection to an electrical utility grid. For example, an islanded system may include a utility connected system that includes a distributed generation generator, a backup generator, or the like. Many types of facilities may utilize backup electrical systems (e.g., hospitals, oil refineries, gas separation plants, data centers, and the like), and may operate as an islanded system when electrical power from a electrical utility grid is unavailable. Other systems may generate their own power under typical conditions (e.g., an offshore drilling ship, exploration ships, cruise ships, military ships, and remote facilities that are not connected to an electrical utility grid). Finally, the systems and methods disclosed herein may be used in the protection of electrical generators connected to electrical delivery systems (e.g., a utility grid). For example, a protection system may be used at a generation site (e.g., a fossil-fuel generation site, a hydroelectric site, a wind farm, and the like).

Islanded electrical power generation and delivery systems may also be referred to as a micro-grid. Micro-grid systems may not have the advantage of being able to receive power from an electric utility grid, and accordingly, micro-grid systems may be designed with redundancies, in order to maximize the availability of electrical power. A micro-grid system may, for example, include multiple electrical generators. Further, the micro-grid system may be configured such that if an electrical generator is taken off-line, either for maintenance or because of a problem, the micro-grid system may continue to operate, although perhaps with reduced capabilities. Various embodiments disclosed herein may provide protection and monitoring of a plurality of electrical power generators, and further, may be configured to implement control actions in order to configure an electric power generation and delivery system.

The embodiments disclosed herein are best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described are illustrated as software modules or components. As used herein, a software module or component may include any type of computer instruction or computer executable code located within a computer-readable device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a computer-readable device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by remote processing devices linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic instructions.

FIG. 1 illustrates a simplified one line diagram of an electric power generation and delivery system 100. In the configuration illustrated in FIG. 1, common-mode faults may result in a blackout of system 100. As the term is used herein, a common-mode fault refers to one root problem that manifests with multiple symptoms. In other words, one underlying event results in the disruption of two or more components.

In a variety of circumstances, undesirable electrical system outages can result in loss of revenue and other adverse consequences. The present disclosure specifically addresses a variety of possible faults, including failure or misoperation of generator exciters and governors, islanding of defective generators, slow fault detection, and clearing of wrong machinery. One of skill in the art will recognize a variety of other types of faults may be addressed by the systems and methods disclosed herein.

System 100, and variations thereof, may be utilized in a variety of applications, including but not limited to any application benefiting from a high reliability power generation and delivery system. In one particular embodiment, system 100 may be utilized in connection with a dynamic positioning vessel. In such embodiments, undesirable electrical system outages can result in significant revenue losses, increased risk of an environmental incident, and damage to public opinion of the industry. In another embodiment, system 100, and variations thereof, may be used as a backup power source for a variety of applications.

System 100 includes, among other things, generators 150, 151, 152, and 153, each of which is configured to generate a sinusoidal waveform. Generators 150-153 may be driven by a variety of sources, including two- and four-cycle diesel engines, combustion turbines, steam turbines, wind turbines, hydro-electric turbines, and the like. Although illustrated as a one-line diagram, electric power delivery system 100 may represent a three phase power system. FIG. 1 illustrates a single phase power system for simplicity.

Generators 150-153 may be connected to an electrical bus 140. Electrical bus 140 may comprise a first bus segment 140*a* and a second bus segment 140*b*. First bus segment 140*a* may be selectively connected to second bus 140*b* by a breaker 142. As illustrated, generators 150-151 may be connected to first bus segment 140*a*, and generators 152-153 may be connected to second bus segment 140*b*. Generators 150-153 may be selectively connected to electrical bus 140 by breakers 130-133.

IEDs 160-164 as shown in FIG. 1, may be configured to control, monitor, protect and/or automate the operation of system 100. Generators 150-153 may be in electrical communication with IEDs 160-163, respectively, while IED 164 is in communication with breaker 142. As used herein, the term IED refers to any microprocessor-based device that monitors, controls, automates, and/or protects monitored equipment within an electric power system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs gather status information from one or more pieces of monitored equipment. IEDs may receive information concerning monitored equipment using sensors, transducers, actuators, and the like.

IEDs 160-164 may also gather and transmit information about monitored equipment using current transformers (CTs) 190, 191, 192, and 193, and potential transformers (PTs) 120, 121, 122, and 123. IEDs may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be time-synchronized as synchrophasors), events, fault distances, differentials, impedances, reactances, frequencies, and the like. IEDs may also communicate settings information, IED identification information, communications information, status information, alarm information, and the like. Information of the types listed above, or more generally, information about the status of monitored equipment is referred to as monitored equipment data.

IEDs 160-164 may also issue control instructions to monitored equipment in order to control various aspects relating to the monitored equipment. For example, an IED may be in communication with a circuit breaker (e.g., IED 164 and breaker 142), and may be capable of sending an instruction to open and/or close the circuit breaker, thus connecting or disconnecting a portion of system 100. In another example, an IED may be in communication with a recloser and capable of controlling reclosing operations. In another example, an IED may be in communication with a voltage regulator and capable of instructing the voltage regulator to tap up and/or down. Other examples of control instructions that may be implemented using IEDs may be known to one having skill in the art, but are not listed here. Information of the types listed above, or more generally, information or instructions directing an IED or other device or equipment to perform a certain action are referred to as control instructions.

IEDs 160-164 may be linked together using a data network 110, and may further be linked to a central monitoring system, such as a supervisory control and data acquisition ("SCADA") system 182, an information system 184, or digital control system ("DCS") 180. The embodiment of FIG. 1 illustrates a star topology having access controller 172 at its center, however, other topologies are also contemplated. For example IEDs 160-164 may be connected directly to SCADA system 182 or DCS system 180. The data communications network of FIG. 1 may include a variety of network technologies, and may comprise network devices such as modems, routers, firewalls, virtual private network servers, and the like. IEDs and other network devices are connected to the communications network through a network interface.

Data regarding the operation of electric power generation and delivery system 100 may be displayed using local Human-machine interface ("HMI") 186. In various embodiments, local HMI 186 may be used by one or more operators to observe various indicators and parameters of the status of electric power generation and delivery system 100. Further, local HMI 186 may provide visual alarms, as necessitated by conditions.

An information system 184 may also receive data from access controller 172. Information system 184 may be utilized in various embodiments to develop customized features suited for a variety of unique applications. For example information system 184 may be utilized to program electric power generation and delivery system 100 to notify key personnel in case of critical alarms and to send to such personnel relevant information.

Data generated by electric power generation and delivery system 100 may be recorded in a data archive. In one embodiment, data received by access controller 172 may be compiled into archive sequence of events ("SOE") records. SOE records may be stored, for example, in comma-separated value files. Each value in the SOE record may be associated with a time stamp. The time stamp may be based upon a time signal provided by common time source 188. In one embodiment, and ACSELERATOR Report Server® software, model no. SEL-5040, may be used to archive data and generate event reports based on the data. In various embodiments, SOE records may include oscillography for both analog and digital signals. Archived data may be used in post-event analysis and/or optimization of electric power generation and delivery system 100.

In certain embodiments, including the embodiment illustrated in FIG. 1, communication among various IEDs and/or higher level systems (e.g., SCADA system 182 or IS 184) may be facilitated by access controller 172. Access controller 172 may also be referred to as an IED, a central IED, or access controller. In various embodiments, access controller 172 may be embodied as the SEL-2020, SEL-2030, SEL-2032, SEL-3332, SEL-3378, or SEL-3530 available from Schweitzer Engineering Laboratories, Inc. of Pullman, Wash. ("Schweitzer Engineering"), and also as described in U.S. Pat. Nos. 5,680,324, 7,630,863, and U.S. Patent Application Publication No. 2009/0254655, the entireties of which are incorporated herein by reference.

Access controller 172 may further be in communication with vector processor 174. Vector processor 174 may be configured to receive data via data network 110 and to process or pre-process that data for use by access controller 172. Vector processor 174, and various components, may be embodied as model nos. SEL-3306, SEL-3378, SEL-3354, and SEL-3530 available from Schweitzer Engineering and also described in U.S. Pat. Nos. 7,698,555, 7,630,863, and 5,680,324, and US Patent Application Publication Nos. 2009/0088990, 2009/0125158, 2009/0099798 and 2010/0002348. In certain embodiments, access controller 172 and vector processor 174 may be combined into a single device, such as model no. SEL-3378 available from Schweitzer Engineering. Access controller 172 may also be in communication with access controller 170. Although not shown in FIG. 1, access controller 170 may be connected to other devices and systems. Access controller 172 and access controller 170 may exchange information about the respective systems in order to enable coordination on a larger scale.

System 100 includes a local protection block 178 and a system protection block 176. Local protection block 178 communicates with system protection block 176. In certain embodiments, communication within local protection block 178 may use direct fiber relay-to-relay or using IEC 61850 protocol using Ethernet. Communication between local protection block 178 and system protection block 176 may also use direct fiber relay-to-relay communications under the IEC 61850 protocol using Ethernet. System protection block 176 may receive and process relevant information from local protection block 178 and may provide control and decisions system-level protection actions.

Local protection block 178 includes IEDs 160-163 and provides various types of local protection actions in connection with generators 150-153. Although in the illustrated embodiment local protection block 178 only protects a specific type of monitored equipment (i.e., generators 150-153), protection of other types of monitored equipment is also contemplated. For example, system protection block 176 may be configured to protect a feeder, a bus, a motor, or a transformer.

While only one IED is associated with each generator in the illustrated embodiment, in alternate embodiments, if redundancy is desired, more than one IED may be associated with one or more generators. In various embodiments, local protection block 178 may be configured to perform a variety of types of local-level protection actions, including: excess or reverse power protection, reactive power protection, differential power protection, loss of excitation protection, grounding brush lift-off detection, out of step protection, resistance temperature detector protection, trip-coil monitoring, current/voltage unbalance protection, overcurrent protection, phase reversal protection, negative sequence protection, under-voltage and over-voltage protection, under-frequency and over-frequency protection. Certain embodiments may offer each of the preceding types of protections, while other embodiments may offer a subset of the protections.

System protection block 176 may provide a variety of types of system-level protection. System-level protection actions may include, for example, common-mode fault detection and resolution, load-dependent start or stop, generator running order selection, load shedding, heavy-consumer start block, blackout start and recovery, generator control, and manual override. In various embodiments when system 100 is operating at less than full generating capacity, or where system 100 is providing backup power during a power outage, a load-shedding scheme may be enabled. The load-shedding scheme may adjust load requirements to match generation capacity. The load-shedding scheme may be designed to include a priority scheme, in which lower priority loads are shed before higher priority loads.

In operation, data may be exchanged between local protection block 178 and system protection block 176; however, local protection block 178 may continue to provide protection to generators 150-153 in the event of a loss of communication between local protection block 178 and system protection block 176. In the event of a loss of communication, IEDs 160-163 may continue to provide local protection to generators 150-153, respectively. Any type of fault detection or protection action that can be monitored or generated by IEDs 160-163 may be implemented by local protection block 178 during an interruption in communication. Local protection block 178 and system protection block 176 may provide some redundant protection features to generators 150-153.

In various embodiments DCS 180 or SCADA system 182 may offer an additional layer of control. DCS system 180 and/or SCADA 182 may receive data feeds from access controller 172, or in alternative embodiments directly from IEDs 160-164. Access controller 172 may operate autonomously from DCS system 180 and/or SCADA system 182. In other words, access controller 172 need not depend on DCS system 180 or SCADA system 182.

In various applications, a protection scheme provided by electric power generation and delivery system 100 may be designed to provide any of the following functions: blocking protection, low impedance protection, or high impedance protection. A low impedance protection scheme may be appropriate where the protection scheme operates in less than 1 cycle. In one particular embodiment, a low impedance relay, such as the SEL-487B Relay, available from Schweitzer Engineering, may provide bus protection. In this embodiment, a number of sources may be accommodated and faults may be cleared in 1 millisecond relay operating time. The total clearing time may also include operating time of a breaker.

Electric power generation and delivery system 100 may utilize, in various embodiments, a variety of communications protocols and physical communication media. Physical communications medium may include SONET or Ethernet. In one embodiment a fiber optic physical communications media may be used to interconnect the various components of the electric power generation and delivery system 100. Further, MIRRORED BITS® communications protocol available from Schweitzer Engineering may be used. In alternative embodiments, electric power generation and delivery system 100 may utilize the IEC 61850 protocol and GOOSE messaging, Modbus®, DNP3, and the like.

Various embodiments may utilize time-synchronized measurements in connection with various protection schemes. A definition of real-time (synchronized) phasors or synchrophasers is provided in the IEEE Standard 1344-1995. A time signal distributed by the Global Positioning System (GPS) may be used, in various embodiments, as a time source for time-synchronized measure. Thus other sources may also be used. Various signals (i.e., voltage, current, speed, power production, and MVAR) may be recorded from a variety of components in an electrical distribution system. This information is used to design the overall generator protection. The sampling rate of 60 messages per second provides this information every cycle.

Synchrophasor measurements may allow for the comparison of data values from a variety of components that may be separated, either geographically or separated components and/or a variety of types of analysis dependent on time. Time synchronization may be used for data organization, real-time decision-making, as well as post-event analysis. The logical comparison of the synchrophasor variables may be performed using a system protection level protection scheme (e.g., system protection block 176 illustrated in FIG. 1). With this functionality, the system performs logic calculations and generates control signals. One or more IEDs included in an electric power generation and delivery system may include various systems for protection, self-monitoring, and event reporting.

Figure 2:
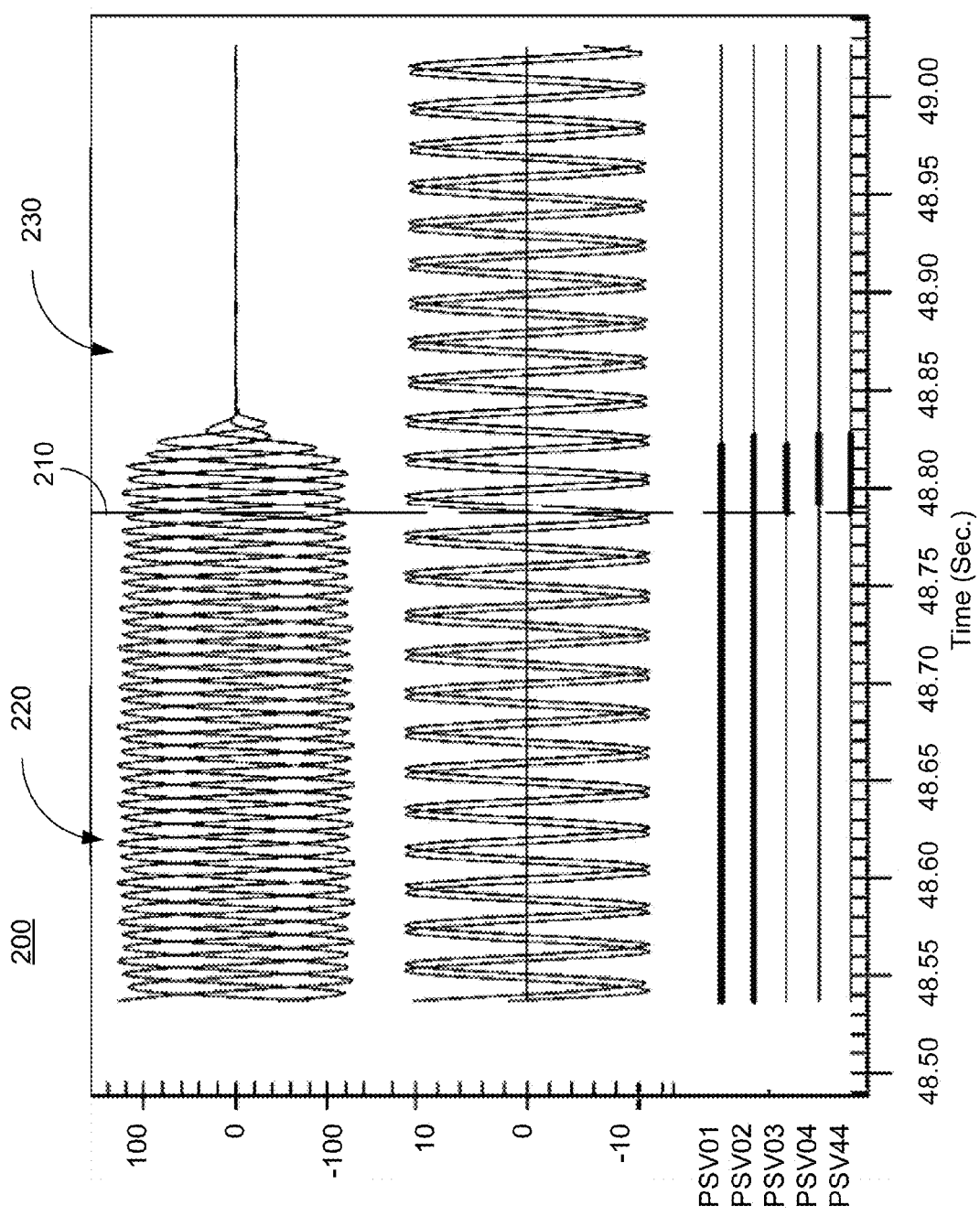
FIG. 2 illustrates an event report showing voltages and currents in a three-phase electric power generation and delivery system.

FIG. 2 illustrates an event report 200 showing voltages and currents in a three-phase electric power generation and delivery system. Event report 200 includes time-synchronized values of each of the three phases of voltage and current. Event report 200 may be displayed to an operator following an event, and/or that may be analyzed following the event. FIG. 2 illustrates the response of a three-phase electric power generation and delivery system during a period 220 prior to a fault 210 and during a period 230 subsequent to fault 210. Data from periods 220 and 230 may be preserved so that it may be analyzed in order to understand the root cause of fault 210 and the protection and control operations taken.

Other types of reports may also be generated. For example, one embodiment may display voltages, phase angles, and slip frequency of electrical power in an electric power generation and delivery system. In various embodiments, acceptable ranges of these parameters may be specified (e.g., the amount of acceptable slip and phase shift values may be specified by a user). These reports may be displayed graphically in a variety of formats.

Figure 3A:
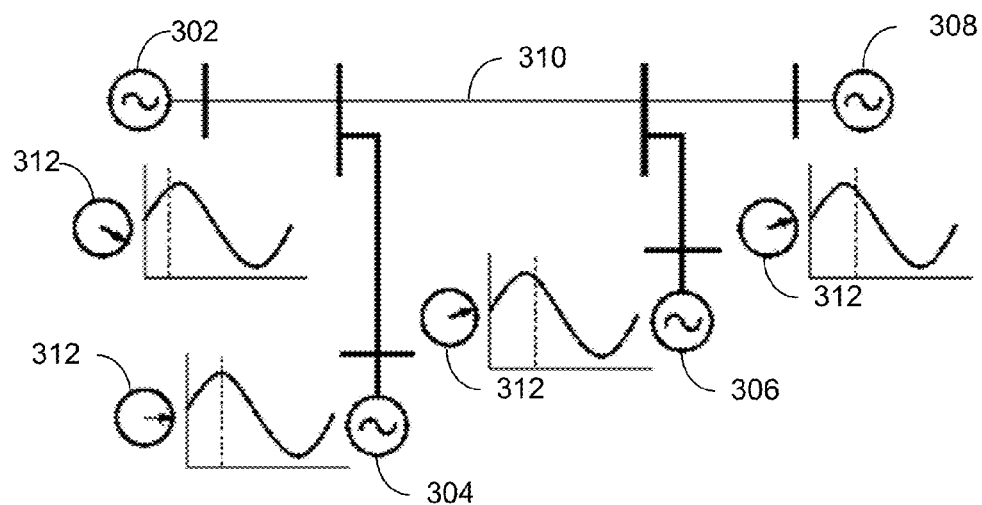
FIG. 3A illustrates a simplified one line diagram of one system that may implement a protection scheme using synchrophasors for the protection of a plurality of generators.

FIG. 3A illustrates one system that may implement a protection scheme using synchrophasors for the protection of generators 302, 304, 306, and 308. Generators 302-308 are connected to a transmission line 310. Measurements may be taken at common time, with the phasor at each location at the common time measured and communicated as indicated by the phasor illustrations 312.

Figure 3B:
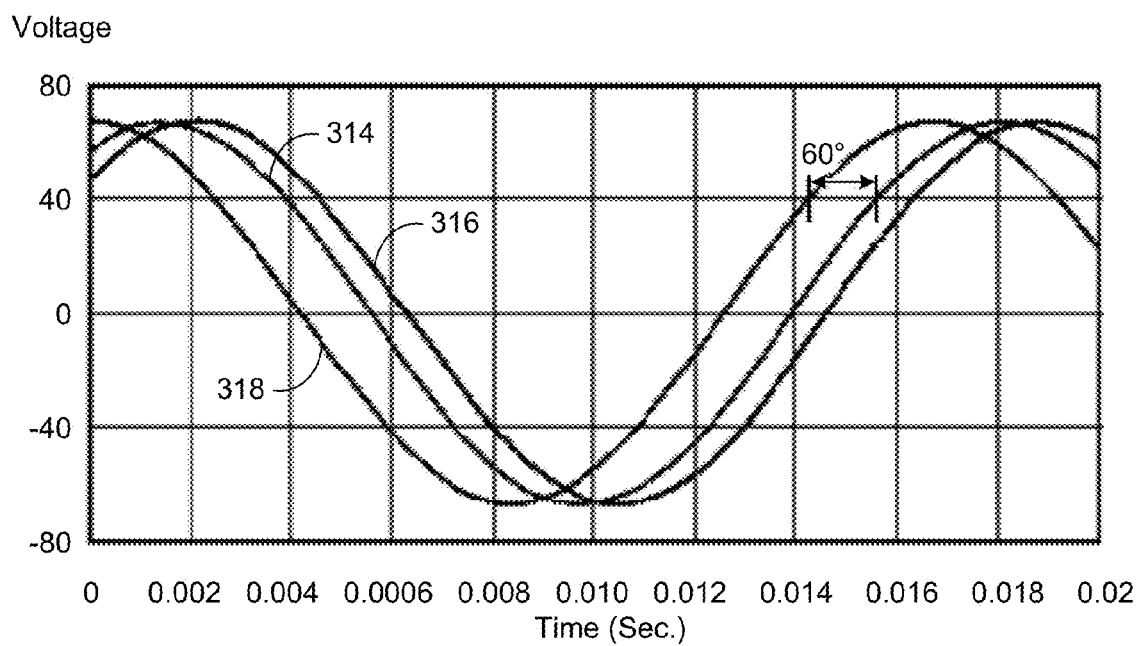
FIG. 3B illustrates a first measured data set and a second measured data set in comparison to a reference data set.

FIG. 3B illustrates a first measured data set 314 and a second measured data set 316 in comparison to a reference data set 318. In the illustrated example, time-synchronized comparison of the reference data set 318 to the first measured data set 314 shows a difference of 60°. Analysis of these data may be used in a variety of applications, including, modal analysis. Using modal analysis, various embodiments may calculate resonance and oscillation frequencies of an electric power distribution system. In various embodiments, modal analysis may be performed using any of the systems and methods disclosed in U.S. Patent Publication No. 2009/0099798, the entirety of which is incorporated herein by reference.

Analysis of synchrophasor data may also be utilized to generate control signals associated with a protection scheme in an electric power generation and delivery system. For example, a protection scheme may comprise rules for load-dependent start/stop, generator running order selection, load shedding, heavy-consumer start block, blackout start and recovery, and/or diesel engine control, based on synchrophasor data.

FIG. 4 illustrates a plot of the power output over time of a power generation and distribution system 400. System 400 includes two generators 410 and 412. Generators 410 and 412 are connected by a bus 414. IED 416 is configured to sample the voltage and current on bus 414. Three periods of time are analyzed based on time-synchronized measurements of power generation. The first time period 420 follows a line trip. System 400 compensates for the line trip and dampens the variations in the power output. The second time period 422 illustrates that system 400 is relatively stable. The damping ratio and amplitude during this period are small, and thus changes in amplitude occur relatively slowly, thus allowing system 400 to control oscillations and to take control actions in order to maintain stability. The third time period 424 follows a line trip and generation drop and precedes a system separation. As illustrated, the damping ratio is negative and the amplitude is large, thus leading to increasing variations in the amplitude of the power output. Analysis of the synchrophasors data may be used to generate a control instruction resulting in the system separation.

Using modal analysis, which may be a part of a system level protection scheme, it may be possible to calculate resonance and oscillation frequencies of a system. These calculations may allow for advanced generator protection schemes. For example, analysis of the data corresponding to time period 424 may signal a need to separate generators 410 and 412.

A variety of types of fault detection systems may be included in various embodiments disclosed herein. Various embodiments, for example, may include arc-flash detection systems. In one embodiment, and arc-flash detection system may detect faults in 2 to 3 milliseconds. Such a response time may be effective in limiting any damage caused by an arc-flash. Various embodiments may include relay logic that relies on both light and current to detect a fault. Peak detector logic is enabled to quickly determine the current without losing accuracy, because filtering requirements delay the sensing of current. Various embodiments of arc-flash detection systems and methods are disclosed in co-pending application Ser. No. 12/562,787, titled Secure Arc Flash Detection, the entirety of which is incorporated herein by reference.

Figure 5A:
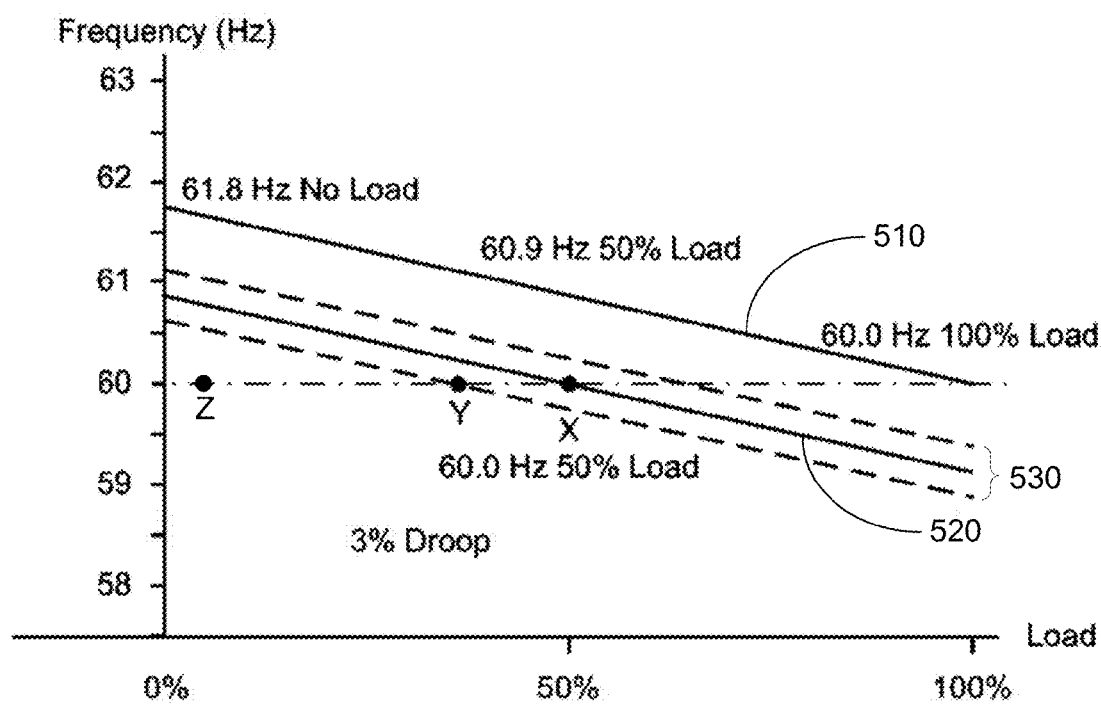
FIG. 5A illustrates a plot of the slope and three percent droop characteristics for a system of generators operating in parallel.
Figure 5B:
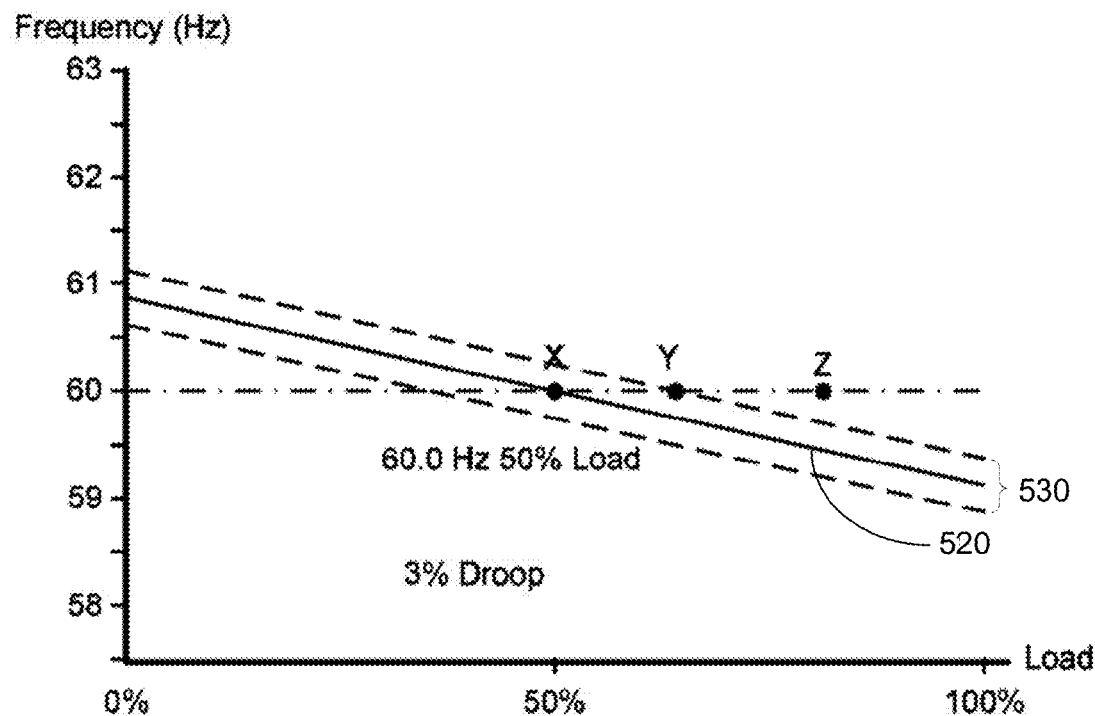
FIG. 5B illustrates a plot of the slope and three percent droop characteristics for a system of generators operating in parallel.

As discussed above, a system level protection scheme may be configured to detect, prevent, or remedy common-mode faults. FIGS. 5A and 5B illustrate one example of a common mode fault. In the example provided in FIGS. 5A and 5B, a plurality of electrical generators (not shown) may be configured to operate in parallel droop mode. In case of a fault on one generator exciter/governor, a system level protection system may attempt to properly detect and isolate only the faulty generator. In detecting the faulty generator, the system may evaluate the response time of controls (e.g., exciter/governor controls) before making isolating or islanding any of the plurality of generators.

When droop and no-load speed are the same on engines driving electrical generators, the generators will share the load equally. Consistent droop results in a predictable speed for a given load on a generator based on a droop curve, the health of the connected engine, and the speed control system. A deviation from this curve beyond an acceptable range is indicative of an unhealthy status in the engine (e.g., the engine is unable to deliver the required power), or a problem with the speed control system or its control system tuning parameters. These symptoms may occur if there is a loss of engine power or a variety of other problems (e.g., a sticky injector, fuel pump failure, dirty fuel filter, incorrectly set ballhead governor, or limited fuel rack linkage movement).

FIGS. 5A and 5B show one example of a common-mode fault that may be detected by a system-level protection scheme. FIGS. 5A and 5B show the operation of a system including at least two generators (not shown) operating in parallel, and in which one of the generators is experiencing a governor fault. FIG. 5A shows the slope and three percent droop characteristics for the generators operating in parallel. The line designated with reference no. 510 may be selected if the generators are operating around 100 percent of a maximum load. As illustrated, at 100% of load the frequency is equal to 60 Hz. The line designated with reference no. 520 is selected if the generators are operating around 50% of a maximum load. As is also shown, at 50% of maximum load, the frequency is equal to 60 Hz.

The system may include a range of acceptable operating conditions 530. The point labeled point X is within the acceptable range of operation 530. Point Y is on the boundary of acceptable operating conditions for the common mode faults. In contrast, point Z is outside of acceptable operating conditions, thus indicating the existence of the problem affecting the overall operation the system. If the load is increased beyond 50 percent, the generator experiencing a governor fault bears a greater proportion of the load, but the system operating frequency goes down on the 3 percent slope. The operating frequency will be 59.1 Hz on line 520 if the load is increased to 100 percent of maximum.

For a low kW fault, when a plurality of generators are generating at full capacity and one generator is operating at a reduced capacity caused by a fault, the system operating point moves from X to Y, as shown in FIG. 5B. Point Y remains within the acceptable range of operation; however, the system is operating under less than optimal conditions. If a malfunction causes the system to operate outside of the range of acceptable operating conditions 530, a protection system may isolate the faulty generator. Accordingly, with the faulty generator isolated, the system load will be shared by the remaining generators. Removal of the faulty generator may cause the system frequency to drop, and may further cause the protection system to generate another control signal to correct the system frequency.

A high kW fault may result from speed control feedback loss or actuator signal loss for a particular defective generator. This type of event results in producing more power than scheduled from the defective generator. This type of fault results in the remaining generators running lightly loaded. FIG. 5B illustrates that if the operating conditions for a generator change from X to Y, a control instruction may be generated to maintain the system within the range of acceptable operating conditions 530. If the control instruction does not address the issue, and the system drifts further to point Z, a control instruction may be generated to isolate the defective generator.

In addition to the system-level protection system, a generator-level protection system may also be running in droop mode. When droop and no-load voltages are set the same on all generators in a system, the generators share the kVAR equally; however, voltage control may be more complex because of the dependence on exciter controls. Exciter control can be initiated based on system-level conditions, thus allowing a system-level protection system to monitor operating conditions.

A variety of problems may be protected against by both a system-level protection system and a generator-level protection system. For example, "generator hunting" may be addressed by both system-level protection and generator-level protection systems. System-level protection may address hunting attributable to faulty AVR electronics, low settings, or unstable voltage control. When a parallel generator is hunting, it periodically takes or sheds reactive power, resulting in hunting in the overall system. System-level protection may identify and take corrective action to isolate a generator causing system hunting, which may, for example, be caused by a faulty exciter. Appropriate action may be programmed based on various parameters and acceptable operating conditions.

Some generator faults may be the result of the fuel rack position and actuator current. When actuator current does not track the rack position, an alarm may be generated. In the case of a generator fuel problem (e.g., damage to fuel line or fuel quality), generator output may not follow the generator fuel rack. Appropriate alarms may be generated and the generator with the fuel problem may be isolated. In a typical operation, generator faults resulting from the fuel rack position and actuator current may be detected, and appropriate action may be implemented, by a system protection block. In the event of a communication failure between the system protection block and a local protection block, the local protection block may provide protection against this type of fault for the local generator.

Fuel rack hunting may be caused by a number of problems, including dead bands in linkages, faulty speed governor electronics, faulty engine generator shaft coupling, etc. A system-level protection system may analyze operating conditions and generate an alarm for the appropriate generator. An appropriate algorithm may utilize as inputs various generator parameters, including the fuel rack position for each generator, in order to identify fuel rack hunting. Fuel rack hunting may be identified, and appropriate action may be implemented, by a system protection block. In the event of a communication failure between the system protection block and the local protection block, the local protection block may provide protection against this type of fault for the local generator.

Figure 6:
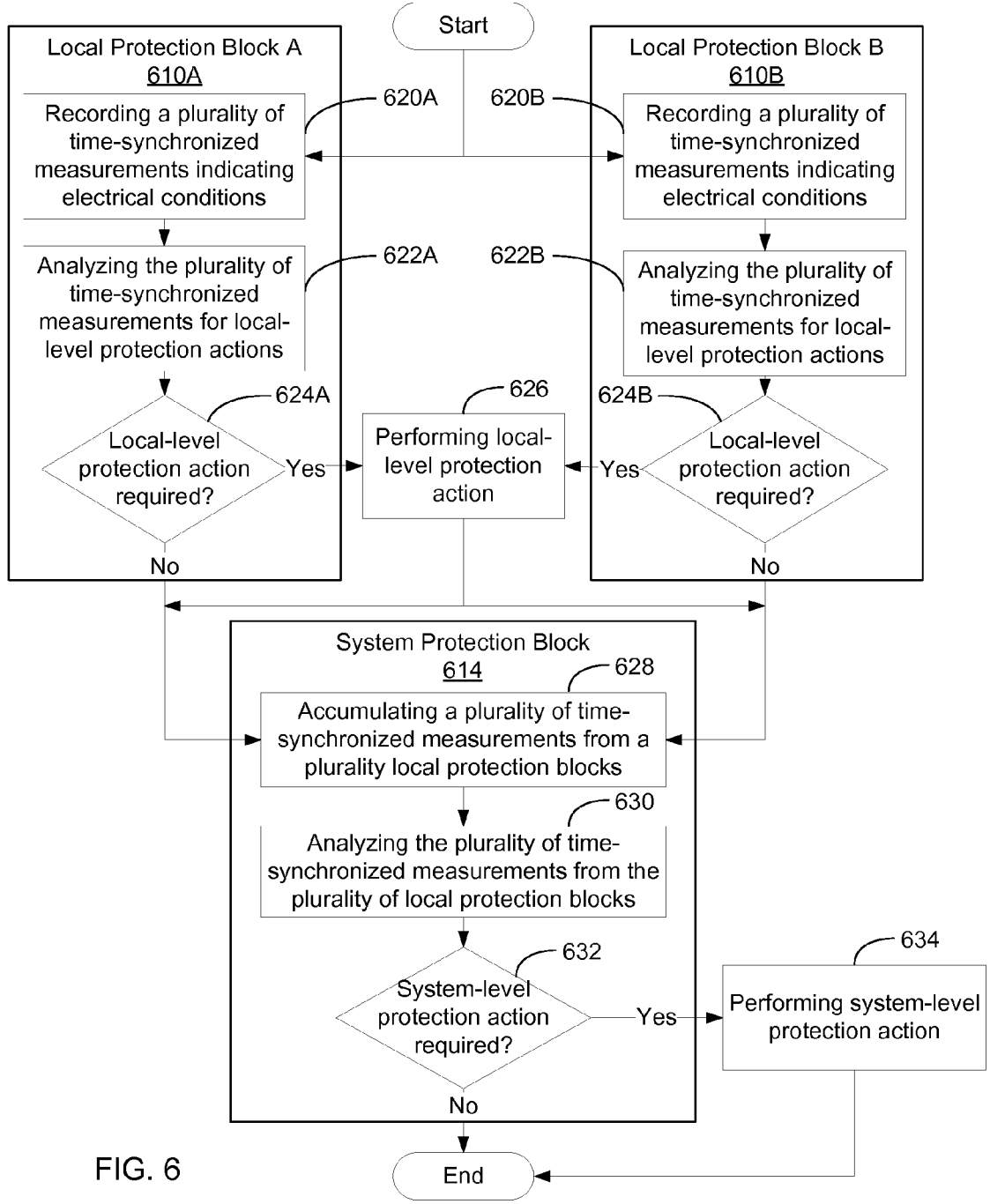
FIG. 6 illustrates a flow diagram of a method for providing a plurality of local protection blocks and a system protection block.

FIG. 6 illustrates a flow diagram of a method 600 for providing a plurality of local protection blocks 610A and 610B and a system protection block 614. Local protection block 610A and local protection block 610B may provide similar functionality, however each local protection block may be configured to monitor a different piece of monitored equipment or segment of an electrical power distribution system. Although FIG. 6 illustrates only two local protection blocks, any number of protection blocks may be included in order to monitor a particular system.

At 620A and 620B, local protection block 610A and 610B, respectively, may record a plurality of time-synchronized measurements indicating electrical conditions associated with a respective piece of monitored equipment. At 622A and 6228, the recorded data may be analyzed for local-level protection actions. It may be determined at 624A and 624B whether local-level protection action is required based on the analyzed measurements. If local-level protection action is required, the local-level protection action may be performed at 626. As discussed above, local-level protection action may be appropriate in remedying a wide variety of potential faults associated with a particular piece of monitored equipment.

System protection block 614 accumulates measurements from local protection blocks 610A and 610B at 628. System protection block 614 may analyze the plurality of time-synchronized measurements from the plurality of local protection blocks at 630. Based on that analysis, a determination may be made regarding whether system-level protection action is required at 632. If system-level protection action is required, the appropriate system-level protection action may be performed at 634.

Figure 7:
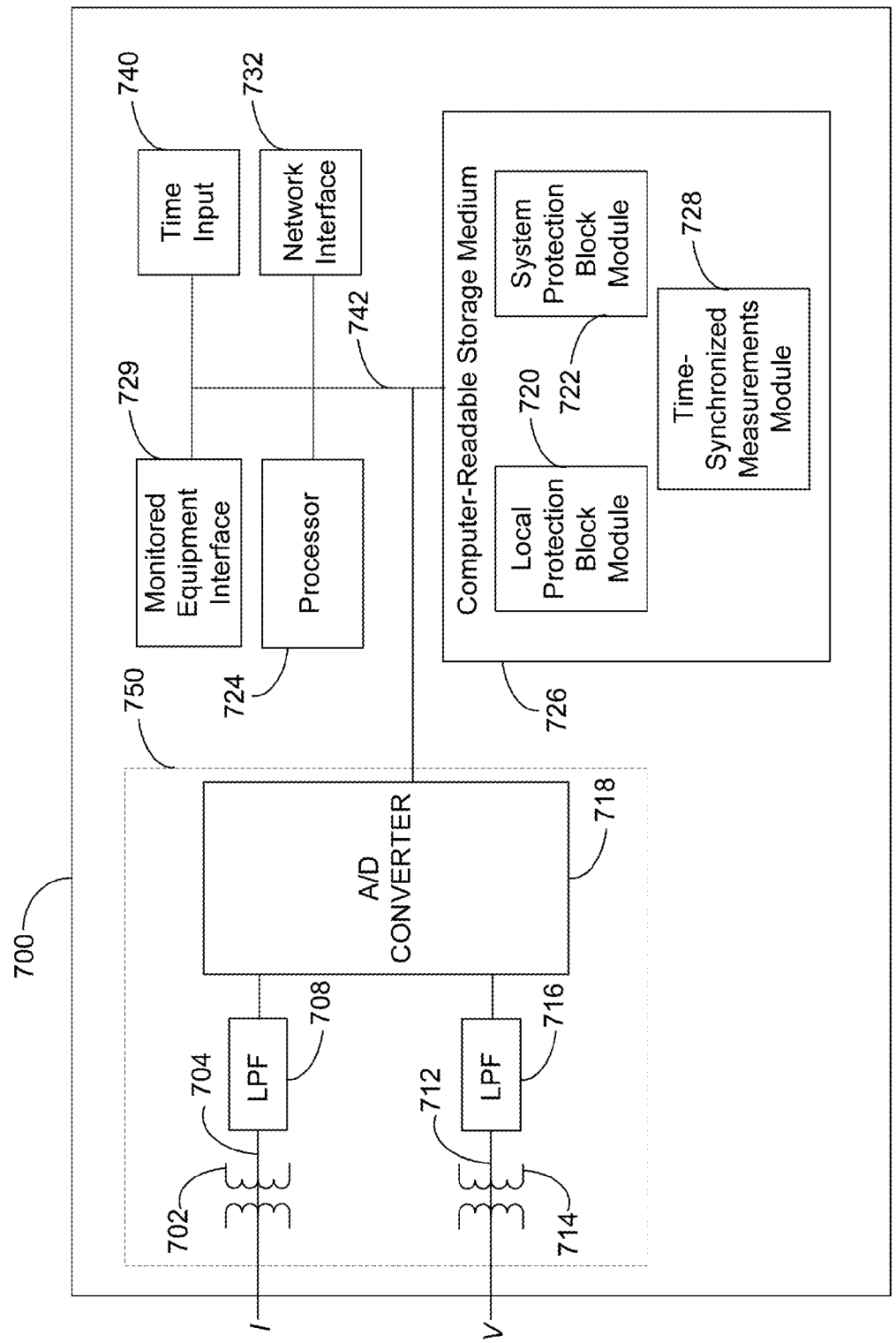
FIG. 7 illustrates a block diagram of an IED configured to implement either a local protection block or a system protection block.

FIG. 7 illustrates a block diagram of an IED 700 configured to implement either a local protection block or a system protection block. One of skill in the art will appreciate that with certain modifications, IED 700 may also serve as an access controller, such as access controller 172 shown in FIG. 1. A data bus 742 may link a monitored equipment interface 729, a time input 740, a network interface 732, a sensor component 750, and a computer-readable storage medium 726 to a processor 724. Network interface 732 may be configured to communicate with a data network. Time input 740 may be configured to receive a time signal. A time signal received via time input 740 may be utilized in order to generate time-synchronized measurements that are based on the same time reference in various locations in an electrical power distribution system. In certain embodiments, a common time reference may be received via network interface 732, and accordingly, a separate time input would not be necessary. Such embodiments may employ any time reference (e.g., a time reference distributed via the IEEE 1588 protocol, IRIG, or a GPS time source). Monitored equipment interface 729 may be configured to receive status information from and issue control instructions to a piece of monitored equipment.

A computer-readable storage medium 726 may be the repository of various modules configured to perform any of the methods described herein, and more specifically to implement the functionality of a local protection block or a system protection block. A local protection block module 720 may include instructions for analyzing a plurality of measurements indicating electrical conditions associated with a particular piece of monitored equipment and determining appropriate circumstances for performing local-level protection actions. Similarly, a system protection block module 722 may include instructions for analyzing a plurality of measurements from a plurality of local protection blocks and determining appropriate circumstances for performing system-level protection actions. A time-synchronized measurements module 728 may include instructions for recording a plurality of measurements indicating electrical conditions associated with monitored equipment, and for associating the plurality of measurements with a time stamp. The time stamp may indicate the time at which each of the plurality of measurements is made. Time-synchronized measurements module 728 may generate a plurality of time-synchronized measurements by associating each of the plurality of measurements with a time stamp. Data collected by time-synchronized measurements module 728 may be analyzed and stored for use in a variety of ways. For example, the plurality of time-synchronized measurements may be used in post-event analysis.

In certain embodiments, IED 700 may include a sensor component 750. In the illustrated embodiment, sensor component 750 is configured to gather data directly from a conductor (not shown) using a current transformer 702 and/or a voltage transformer 714. Voltage transformer 714 may be configured to step-down the power system's voltage (V) to a secondary voltage waveform 712 having a magnitude that can be readily monitored and measured by IED 700. Similarly, current transformer 702 may be configured to proportionally step-down the power system's line current (I) to a secondary current waveform 704 having a magnitude that can be readily monitored and measured by IED 700. Low pass filters 708, 716 respectively filter the secondary current waveform 704 and the secondary voltage waveform 712. An analog-to-digital converter 718 may multiplex, sample and/or digitize the filtered waveforms to form corresponding digitized current and voltage signals.

In other embodiments, sensor component 750 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like.

A/D converter 718 may be connected to bus 742. A/D converter 718 may generate digitized representations of current and voltage signals, which may be analyzed by IED 700. In various embodiments, the digitized current and voltage signals may be compared against conditions, either to determine when it may be appropriate to initiate a local-level protection action or a system-level protection action.

Processor 724 may be configured to process communications received via network interface 732, time input 740, sensor component 750, and monitored equipment interface 729. Processor 724 may operate using any number of processing rates and architectures. Processor 724 may be configured to perform various algorithms and calculations described herein. Processor 724 may be embodied as a general purpose integrated circuit, an application specific integrated circuit, a field-programmable gate array, and other programmable logic devices.

It will be obvious to those having skill in the art that many changes may be made to the details of the above-described embodiments without departing from the underlying principles of the invention. The scope of the present invention should, therefore, be determined only by the following claims.

We claim:

1. A system to monitor and control a plurality of electric power generators in an electric power delivery system, the system comprising:
    a system protection Intelligent Electronic Device ("IED") processor;
    a system protection IED computer-readable storage medium, comprising instructions executable on the system protection IED processor that enable the system protection IED to:
        analyze a plurality of time-synchronized measurements indicating conditions associated with the plurality of generators, wherein the plurality of time-synchronized measurements are generated based on a common time reference;
        determine a system-level protection action based upon the analysis of the plurality of time-synchronized measurements by:
            detecting a common-mode fault condition as a condition of one generator of the plurality of generators that affects operating conditions of another generator of the plurality of generators;
            determining operating conditions of the electric power delivery system based on the plurality of time-synchronized measurements;
            detecting the generator associated with the detected common-mode fault condition;
            comparing the operating conditions with predetermined acceptable operating conditions of the electric power delivery system;
            when a common-mode fault is detected and when the operating conditions are outside of the predetermined acceptable operating conditions, determining the system-level protection action to be disconnection of the generator associated with the detected common-mode fault; and,
            when a common-mode fault is detected and when the operating conditions are within the predetermined acceptable operating conditions, determining that the system-level protection action on the generator associated with the detected common-mode fault is not required;
        based on the comparison of the operating conditions with the predetermined acceptable operating conditions, perform the system-level protection action by disconnecting the electrical generator associated with the common-mode fault; and
        evaluate response time of controls of the generator associated with the detected common-mode fault before disconnecting the generator associated with the detected common-mode fault.

2. The system of claim 1, wherein the plurality of time-synchronized measurements indicate status of the electrical generator.

3. The system of claim 1, wherein the conditions comprise deviation from a droop curve.

4. The system of claim 1, further comprising a plurality of local protection IEDs in communication with the system protection IED, and each including:
    a local protection IED processor;
    a local protection IED computer-readable storage medium, comprising instructions executable on the local protection IED processor that enable the local protection IED to:
        record a plurality of measurements indicating conditions associated with the plurality of generators;
        associate the plurality of measurements with time stamps indicating the times at which each of the measurements is made to generate the plurality of time-synchronized measurements;
        analyze the plurality of time-synchronized measurements;
        determine a local-level protection action based upon the analysis of the time-synchronized measurements; and
        transmit the plurality of time-synchronized measurements to the system protection IED.

5. The system of claim 4 wherein the local-level protection action comprises one of: excess power protection; reverse power protection; reactive power protection; differential power protection; loss of excitation protection; out-of-step protection; resistance temperature detector protection; trip-coil monitoring; current/voltage unbalance protection; phase reversal protection; negative-sequence protection; under-voltage protection; over-voltage protection; under-frequency protection; and, over-frequency protection.

6. A method for managing a plurality of electric power generators in an electric power delivery system, comprising:

operating a system protection block at a supervisory level, the system protection block configured to manage the plurality of electric power generators;

the system protection block receiving a plurality of time-synchronized measurements associated with the plurality of electric power generators, wherein the plurality of time-synchronized measurements are generated based on a common time reference;

the system protection block analyzing the plurality of time-synchronized measurements indicating conditions associated with the plurality of electric power generators;

the system protection block determining a system-level protection action based upon the analysis of the plurality of time-synchronized measurements by:

detecting a common-mode fault condition as a condition of one generator of the plurality of generators that affects operating conditions of another generator of the plurality of generators;

determining operating conditions of the electric power delivery system based on the plurality of time-synchronized measurements;

detecting the generator associated with the common-mode fault condition;

comparing the operating conditions with predetermined acceptable operating conditions of the electric power delivery system;

when a common-mode fault is detected and when the operating conditions are outside of the predetermined acceptable operating conditions, determining the system-level protection action to be disconnection of the generator associated with the detected common-mode fault; and, when a common-mode fault is detected and when the operating conditions are within the predetermined acceptable operating conditions, determining that the system-level protection action on the generator associated with the detected common-mode fault is not required;

based on the comparison of the operating conditions with the predetermined acceptable operating conditions, the system protection block performing the system level protection action by disconnecting the electrical generator associated with the common-mode fault, and the system protection block evaluating response time of controls of the generator associated with the detected common-mode fault before disconnecting the generator associated with the detected common-mode fault.

7. The method of claim 6, wherein the plurality of time-synchronized measurements indicate status of the electrical generator.

8. The method of claim 6, wherein the conditions comprise deviation from a droop curve.

9. The method of claim 6, further comprising:

recording the plurality of time-synchronized measurements by a plurality of local protection blocks associated with the plurality of electrical power generators;

the local protection blocks associating the plurality of measurements with time stamps indicating the times at which each of the measurements is made to generate the plurality of time-synchronized measurements;

the local protection blocks analyzing the plurality of time-synchronized measurements;

the local protection blocks determining a local-level protection action based upon the analysis of the time-synchronized measurements; and the local protection blocks transmitting the plurality of time-synchronized measurements to the system protection block.

10. The method of claim 9, wherein the local-level protection action comprises one of: excess power protection; reverse power protection; reactive power protection; differential power protection; loss of excitation protection; out-of-step protection; resistance temperature detector protection; trip-coil monitoring; current/voltage unbalance protection; phase reversal protection; negative-sequence protection; under-voltage protection; over-voltage protection; under-frequency protection; and, over-frequency protection.

11. An intelligent electronic device (IED) for monitoring and control of a plurality of electric power generators in an electric power delivery system, the IED comprising:

a system protection IED processor;

a system protection IED computer-readable storage medium, comprising instructions executable on the system protection IED processor that enable the system protection IED to:

analyze a plurality of time-synchronized measurements indicating conditions associated with the plurality of generators, wherein the plurality of time-synchronized measurements are generated based on a common time reference;

determine a system-level protection action based upon the analysis of the plurality of time-synchronized measurements by:

detecting a common-mode fault condition as a condition of one generator of the plurality of generators that affects operation conditions of another generator of the plurality of generators;

determining operating conditions of the electric power delivery system based on the plurality of time-synchronized measurements;

detecting the generator associated with the detected common-mode fault condition;

comparing the operating conditions with predetermined acceptable operating conditions of the electric power delivery system;

when a common-mode fault is detected and when the operating conditions are outside of the predetermined acceptable operating conditions, determining the system-level protection action to be disconnection of the generator associated with the detected common-mode fault; and, when a common-mode fault is detected and when the operating conditions are within the predetermined acceptable operating conditions, determining that the system-level protection action on the generator associated with the detected common-mode fault is not required;

based on the comparison of the operating conditions with the predetermined acceptable operating conditions, perform the system-level protection action by disconnecting the electrical generator associated with the common-mode fault; and evaluate response time of controls of the generator associated with the detected common-mode fault before disconnecting the generator associated with the detected common-mode fault.

12. The IED of claim 11, wherein the plurality of time-synchronized measurements indicate status of the electrical generator.

13. The IED of claim 11, wherein the IED comprises:
an access controller; and
a vector processor.

* * * * *